United States Patent [19]

Spencer et al.

[11] 4,453,529
[45] Jun. 12, 1984

[54] PORTABLE GRILL

[76] Inventors: Fredric J. Spencer, 306 E. 55th, Hinsdale, Ill. 60521; Stanley P. Turek, 4439 S. Knox Ave., Chicago, Ill. 60632

[21] Appl. No.: 467,243

[22] Filed: Feb. 17, 1983

[51] Int. Cl.³ .................................................. F24J 3/02
[52] U.S. Cl. ................................. 126/9 R; 126/25 R
[58] Field of Search ............... 126/29, 30, 9 R, 9 A, 126/9 B, 25 R, 38; 165/67, 68, 76, 77, 78

[56] References Cited

U.S. PATENT DOCUMENTS

| | | | |
|---|---|---|---|
| 2,302,984 | 11/1942 | Tollzien | 126/9 R |
| 2,497,994 | 2/1950 | Jones | 126/9 R |
| 2,852,016 | 9/1958 | Weatherwax | 126/9 R |
| 3,297,017 | 1/1967 | Levin | 126/9 R |
| 3,388,421 | 6/1968 | Koziol | 126/25 R |
| 3,611,912 | 10/1971 | Choc | 126/9 R |
| 3,753,431 | 8/1973 | Koziol | 126/38 |
| 3,791,368 | 2/1974 | Hunt | 126/9 R |
| 3,812,840 | 5/1974 | Whaler | 126/25 R |
| 3,976,046 | 8/1976 | Morton | 126/9 R |
| 4,108,141 | 8/1978 | Bauer | 126/9 R |
| 4,284,058 | 8/1981 | Lutz | 126/9 R |
| 4,290,408 | 9/1981 | Juett | 126/25 R |

*Primary Examiner*—Daniel J. O'Connor
*Attorney, Agent, or Firm*—W. A. Snow

[57] ABSTRACT

This invention relates to a small portable grill, wherein the fire box and the hood or cover have a depth and are removably hinged together, pivoted handle means on the hood to retain the fire box and hood in closed position, and manipulate the hood in both open and lateral position, the fire box bottom wall being provided with a series of equispaced indentations whereby each indentation may readily support a single charcoal briquette and of a spacing that each briquette touches adjacent briquettes, removable grill rods are supported over said fire box and said fire box has pivotal legs for supporting the grill above a surface and provides means for carrying the grill in closed position. Therefore this grill is especially suited for use on patios or porches or balconies and is ideal for fishermen, campers, picnickers and hunters.

1 Claim, 8 Drawing Figures

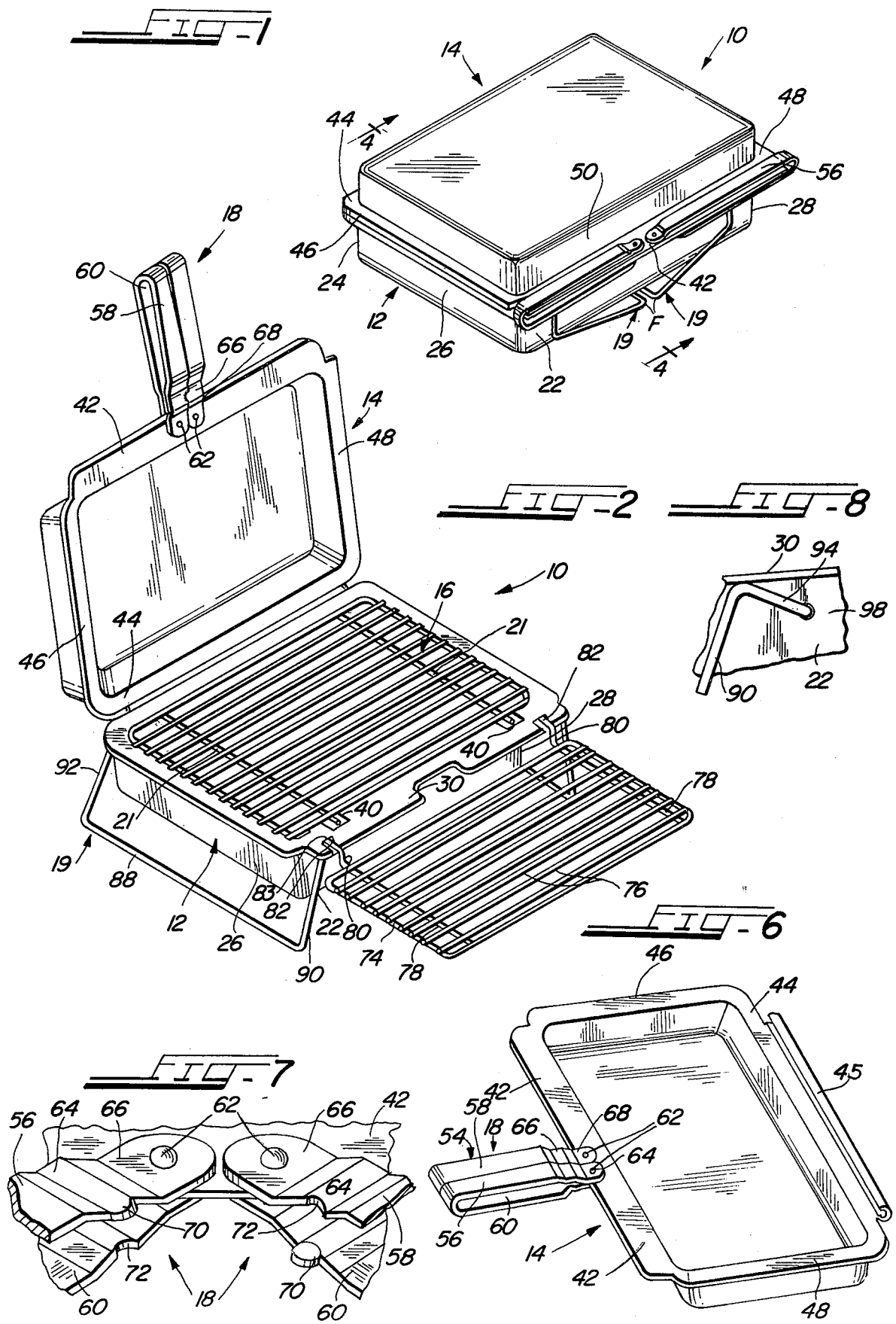

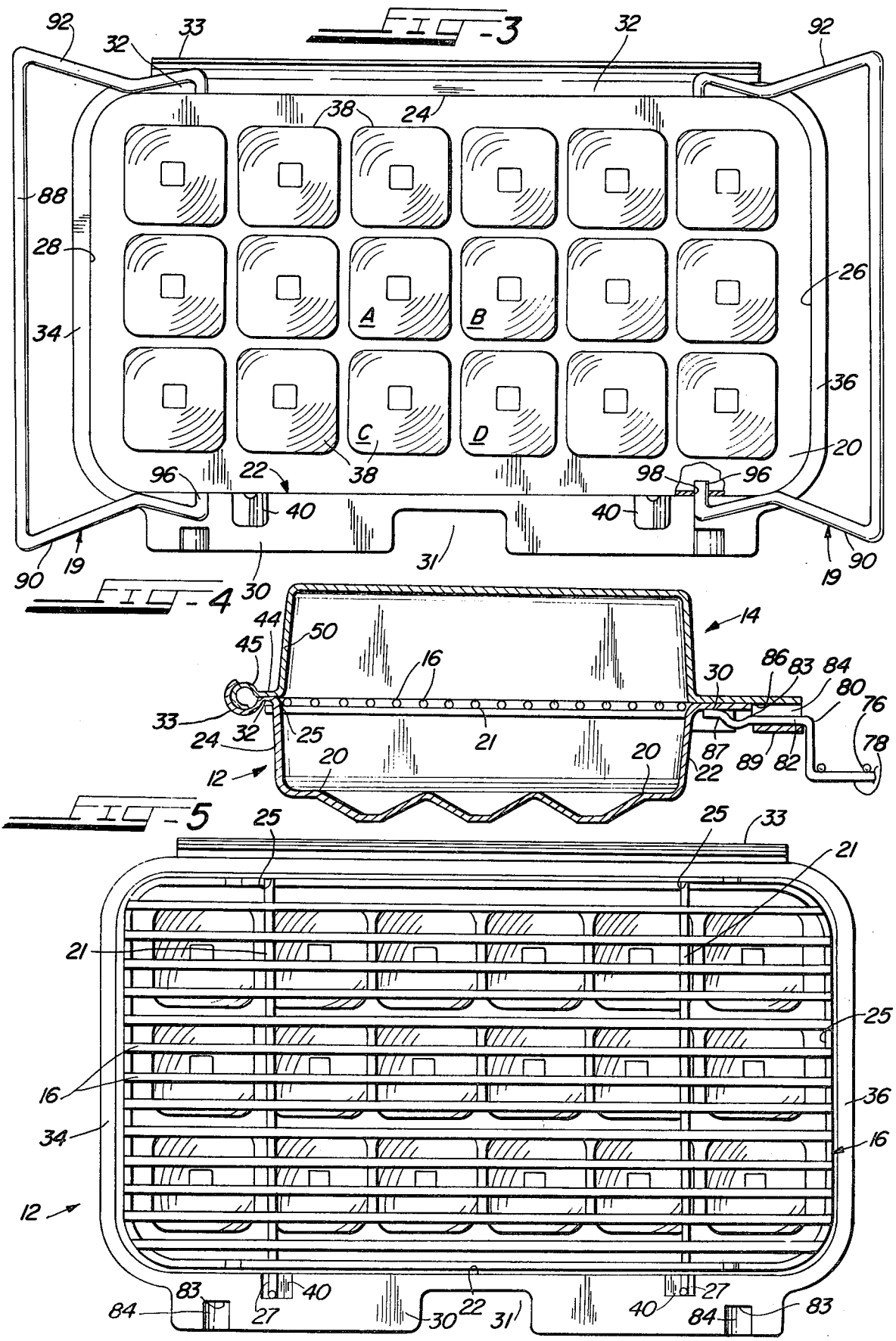

PORTABLE GRILL

BACKGROUND OF INVENTION

Most charcoal grills are large and cumbersome and not portable in the sense they are relatively small and easily portable. There are some miniature grills on the market but they are only smaller versions of the large grills and not portable per se. There is a definite need for a relatively small grill that may readily be transportable and used over and over again.

SUMMARY OF INVENTION

An inexpensive portable grill having a deep fire box and a deep hood pivoted thereto, a pair of foldable legs pivotally secured to the fire box to support the grill above the surface, flanges on the lower peripheral edges of said hood and on the upper peripheral edges of said fire box, a pair of side-by-side handles pivoted at one end to the front flange of said hood and medially of its end, each handle having an upper and lower portion whereby when said handles may be closed against the hood and fire box they encompass the front flanges of the fire box and hood to hold the two parts in closed portable position, the inner surface of the hood is coated with a non-stick material such as polytetrafluoroethylene, known as Teflon or the like, the bottom of the fire box having equispaced small depressions each of a size to support a single charcoal briquette whereby each briquette abuts adjoining briquettes at their edges.

BRIEF DESCRIPTION OF DRAWINGS

FIG. 1 is a perspective view of the portable grill in closed position.

FIG. 2 is a perspective view of the grill in open or operative position with a detachable shelf supported thereon.

FIG. 3 is a bottom plan view of the fire box.

FIG. 4 is a vertical cross sectional of the grill in closed position taken substantially on lines 4—4 of FIG. 1 with the handles removed for clarity.

FIG. 5 is a top plan view of the fire box with the grill rods in place.

FIG. 6 is a perspective view of the cover or hood in inverted position which can be used as a frying pan.

FIG. 7 is a perspective fragmentary view of the handles at point of pivot anchorage.

FIG. 8 is a fragmentary plan view disclosing the upper surface of side legs abutting the lower surface of the flange.

DETAILED DESCRIPTION OF DRAWINGS

The device of the present invention 10 comprises generally a fire box 12, a cover 14, a grill frame and rods 16, a pair of pivoted handles 18 and pivoted legs 19.

The fire box 12 has a bottom wall 20, side walls 22, 24 and end walls 26, 28 each terminating in right angled, outwardly extending flanges 30, 32, 34, 36 respectively and having depth of substantially 2 inches, a width of about 7½ inches and a length of approximately 12 inches. The flange 30 on front side wall 22 extends outwardly further than the other flanges, and is provided with an enlarged opening 31. The flange 32 on the rear side wall has an outer portion turned back upon itself to form a "C" shape as at 33, in vertical cross section, and becomes the lower half of a hinge.

It will be noted in FIGS. 3, 4 and 5 the bottom wall is provided with a series of equispaced depressions or indentations 38 running latitudinally and longitudinally terminating in square bottom 39 and are each of a size to position, a substantially square in section, charcoal briquette therein whereby each briquette will abut adjoining briquettes.

The grill frame 16 comprises spaced rods 16 which are each spacedly secured thereto and spaced transverse rods 21 with the ends 25, 27 which extend beyond the frame and are seated in appropriate apertures 29 in the side wall 24 and at the other ends seated in depressions 40 in the flange 30 respectively, to support the grill frame adjacent to the top of walls 22, 24, 26, 28.

The hood or cover 14 has substantially the same dimensions as that of fire box 12 including the identical flanges 42, 44, 46, and 48. A portion of flange 44 on the rear wall 50 is also bent in "C" shape as at 45 to form the other half of the hinge but almost closed and smaller than the "C" pivot 33 in flange 32 to be loosely sidably engaged in the "C" shaped member 33 in flange 32 to pivot therein. The hood may be shiftable laterally to control the amount of air admitted to the fire in fire box.

A pair of handles 54, 56 are each pivotably secured adjacent each other to the flange 42 on the front wall 52 of the hood 14 as seen in FIGS. 1, 6 and 7. The shank of each of the handles is elongated and bent back upon itself so as to provide a pair of spaced apart shanks 58, 60. The ends of each of the shanks are brought together in offset flat portions 64, 66 and pivotably secured at 62 to the flange 42. The purpose of the spaced apart shanks 58, 60 is two fold, namely to keep the handles cool in open position and when in folded position, see FIG. 1, to hold the hood and fire box together in one piece. To keep the handles in close juxtaposition when in open position (see FIGS. 2 and 7) outwardly extending protrusions 70 on the flat offset portion 64 (one on the upper wall of one and the offset wall 64 of the other) are positioned in grooves 72 (also one in the upper offset and one in the lower offset.) Thus the handles are positioned at right angles to the flange 42 medially of the ends of the flange 42.

A detachable shelf is provided for the front of the fire box 12 comprising a rectangular shaped rod frame 74 to which spaced elongated rods 76 are welded thereto, a pair of spaced transverse rods 78 are positioned below the rods 76 and welded thereto. One end of each of the rods 78 extend outwardly of the frame and bend upwardly at right angles at 80 and an additional portion 82 extends horizontally and positioned in grooves 84 (see FIG. 4). The free end of the horizontal section 82 is inserted into the aperture 83 formed by providing the grooves 84 in the flange 42, so that the horizontal portion 82 lies in groove 84 to support the shelf below the grill rods frame 16. The free ends of each member 82 are bent downwardly and upwardly at 87 to stabilize the shelf.

It is to be noted that the lower surface 89 of the grooves 84 extend downwardly below the flange 42 so that the lower shank of the handle will seat thereagainst to retain the hood and fire box in closed position when the handles are moved to closed position.

The fire box is held above a surface by a pair of spaced legs 19. Each leg comprises a horizontal portion 88 and side portions 90, 92. The upper ends of portions 90, 92 are positioned to abut against the lower end of flange 30. The upper portion 94 is then bent downwardly and at right angles at 96 to be inserted through appropriate apertures 98 in the front and rear walls 22, 24.

When the legs 19 are folded back against the lower surface of the fire box bottom wall 20, one may carry the portable grill by inserting the adjacent fingers at the point F (see FIG. 1). Also one may carry small provisions in the hood after closing because of its depth.

To supply air to the fire box, the hood or cover is merely moved laterally in the loose hinge 33, 44. The more air supplied the hotter the fire and vice versa.

Another feature, since the inner face of the hood is coated with a non-stick composition, such as Teflon, the cover or hood may be removed from the fire box by sliding the same laterally in one direction out of the hinge. Now the hood is inverted and may be used as a frying pan if so desired.

Also, if one were grilling a single hamburger, for instance, only four briquettes may be used in the central four depressions in the bottom of the fire box labeled A, B, C, and D in FIG. 3 and lighted. Thus with the hamburger placed directly thereover on the grill and the cover closed and shifted slightly laterally it can readily be cooked.

Also, with the inverted cover or hood positioned on the fire box over the fire, one may cook anything desired.

Also, the unit is readily collapsible, compact and easy to carry and requires little space wherever stored.

It is to be understood that many details may be altered or omitted without departing from the spirit of the following claims.

I claim:

1. A portable grill having a deep fire box and hood hingedly secured together, the inner surface of said hood being coated with teflon, each having rear and front and side walls, a pair of spaced foldable legs secured to said fire box and pivotally secured to said front and rear walls thereof, peripheral flanges extending outwardly of each of said fire box and hood walls, the rear wall flanges of the fire box and hood and the free end of the flanges are bent in the form of a "C" in vertical cross section, the "C" on the hood rear flange being smaller than the "C" of the flange of the fire box to readily, slidably and rotatively fit therein, a pair of handles pivotally secured medially to the front wall flange of said hood for raising and lowering said hood and in closed position to retain the fire box and hood in closed condition, said handles are positioned on and extend outwardly of said hood front wall flange and abut each other, and the flanges on the front walls of said fire box and hood extend outwardly further than the other flanges, grill rods secured on the upper end of said fire box, said bottom of the fire box is provided with a series of equi-spaced depressions therein whereby each depression will support a charcoal briquette and each briquette will abut adjacent briquettes.

* * * * *